United States Patent [19]

Nelson

[11] Patent Number: 5,150,966

[45] Date of Patent: Sep. 29, 1992

[54] UNIFORM INTENSITY PROFILE CATADIOPTRIC LENS

[75] Inventor: John C. Nelson, The Sea Ranch, Calif.

[73] Assignee: Minnesota Mining and Manufacturing Company, Saint Paul, Minn.

[21] Appl. No.: 585,308

[22] Filed: Sep. 19, 1990

[51] Int. Cl.⁵ ............................................. F21V 5/02
[52] U.S. Cl. ................................. 362/337; 362/327; 362/328; 362/336
[58] Field of Search ............... 362/327, 335, 336, 337, 362/343, 328, 339, 329

[56] References Cited

U.S. PATENT DOCUMENTS

| | | | |
|---|---|---|---|
| 3,671,101 | 6/1972 | Finch | 362/327 |
| 4,755,921 | 7/1988 | Nelson | 362/309 |
| 4,874,228 | 10/1989 | Aho et al. | 362/327 |
| 4,989,125 | 1/1991 | Cobb, Jr. et al. | 362/327 |
| 5,029,060 | 7/1991 | Aho et al. | 362/329 |

FOREIGN PATENT DOCUMENTS 294069 7/1928 United Kingdom ............... 362/327

Primary Examiner—Ira S. Lazarus
Assistant Examiner—Y. Quach
Attorney, Agent, or Firm—Gary L. Griswold; Walter N. Kirn; Stephen W. Buckingham

[57] ABSTRACT

The present invention is a light fixture having a catadioptric lens designed to discard preselected amounts of light from a light source. The percentage of the light discarded will vary over the surface of the reflector in order to provide a predetermined output intensity distribution.

12 Claims, 1 Drawing Sheet

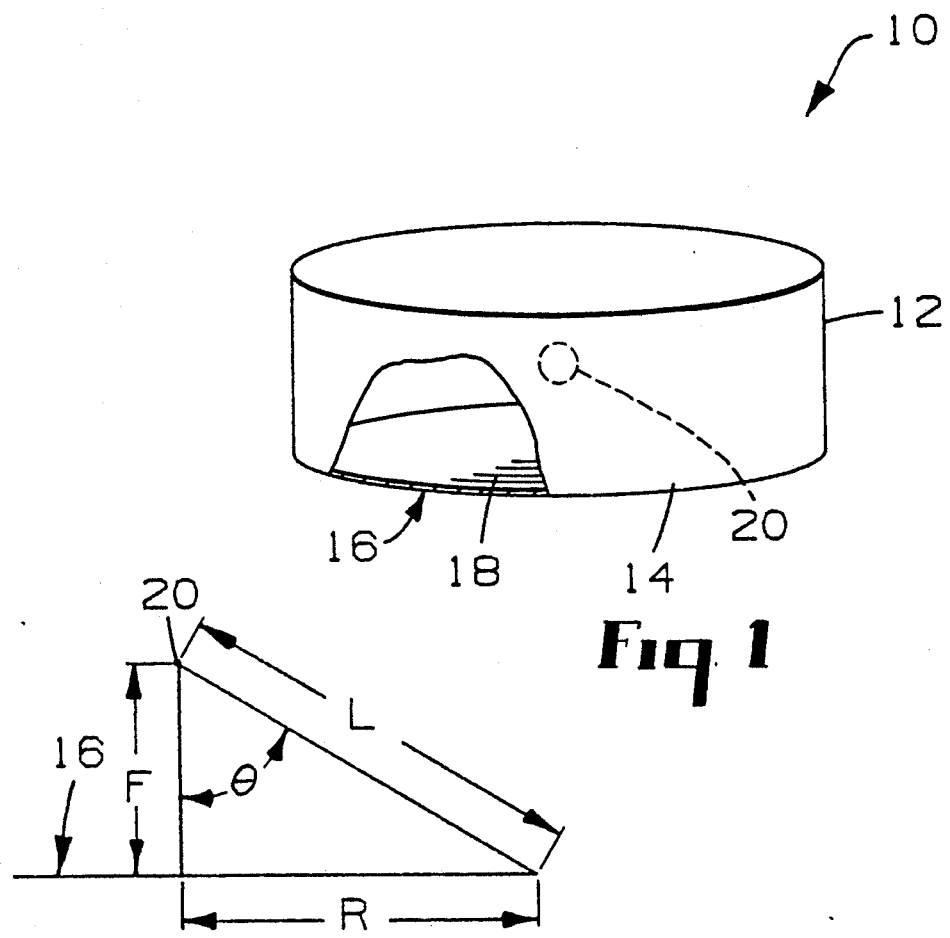
Fig. 1
Fig. 2
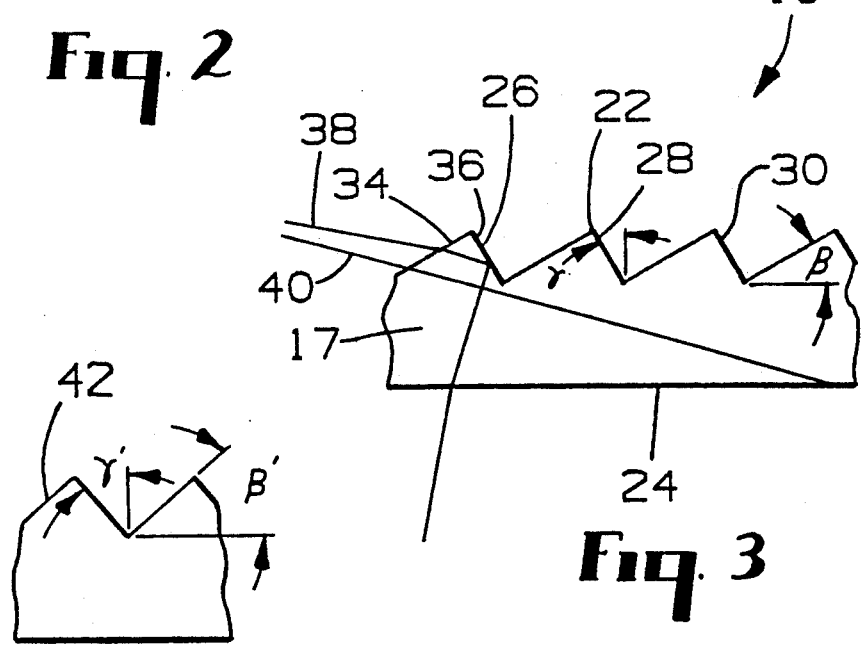
Fig. 3
Fig. 4

UNIFORM INTENSITY PROFILE CATADIOPTRIC LENS

BACKGROUND OF THE INVENTION

A common desire in designing a lighting fixture is to provide such a fixture such that it will provide a uniform level of illumination across its entire aperture. Various techniques have been used to accomplish this. For example, one such light fixture is shown in commonly-assigned U.S. Pat. 4,791,540. The system of that patent uses specialized film in the aperture in order to ensure that the light will undergo multiple reflections before emerging. In this way the light is evenly distributed throughout the optical cavity providing a uniform intensity output.

Another technique is shown in commonly-assigned copending application Ser. No. 192,212, filed May 10, 1988. According to the technique taught therein, a Fresnel-type reflector is provided wherein some of the Fresnel structures have multiple active faces. Some of these faces are used to direct light out of the light fixture in the intended direction, while others are used to discard excess light in areas close to the light source.

SUMMARY OF THE INVENTION

According to the invention a light fixture has a housing defining an optical cavity with an optical window for allowing light to escape from the housing. The light fixture further has a light source within the optical cavity. A lens lies in said optical window and has a first surface external to the optical cavity and a second surface internal to the optical cavity. The second surface is a structured surface. The structured surface has a plurality of triangular prisms formed thereon. Each of the triangular prisms has a transmissive facet and a reflective facet, the transmissive facets making first angles with the optical window and the reflective facets making second angles with a normal to the optical window, where the first and second angles for each prism are chosen such that the light fixture will provide a preselected light intensity distribution over the optical window.

BRIEF DESCRIPTION OF THE DRAWINGS

FIG. 1 is a view of a light fixture according to the invention;

FIG. 2 is a schematic diagram of a light fixture according to the invention;

FIG. 3 is a side view of a first portion of a lens for use in a light fixture according to the invention; and FIG. 4 is a side view of a second portion of a lens for use in a light fixture according to the invention.

DETAILED DESCRIPTION OF A PREFERRED EMBODIMENT

FIG. 1 illustrates an embodiment of the invention. In FIG. 1 a light fixture, 10, includes a housing 12 defining an optical cavity. It also includes an optical window 14 through which the light escapes. In a preferred embodiment the optical window lies in a plane. Furthermore it includes a catadioptric lens, 16, having a structured surface and lying in optical window 14. The structures are schematically shown as 18 and are typically circular and concentric. Light fixture 10 also includes a light source, 20.

FIG. 2 schematically shows the light fixture of the invention in order to define some of the symbols to be used in the subsequent description. F is the focal length of lens 16 and represents the distance between light source 20 and lens 16. R is the radial distance from the center of lens 16 to a point under consideration. L is the distance from light source 20 to the point under consideration. The angle of incidence of a light ray on lens 16 is identified as $\theta$.

The goal in designing a light fixture according to the invention is to provide the appearance of a uniform light intensity across the aperture. The expression appearance is used because, in most situations, some variation will not be noticeable. Typically an intensity ratio as great as three to one from the brightest to darkest region will not be noticed. Because the appearance of uniform intensity is provided by effectively discarding some of the light, allowing the actual intensity distribution to be less than totally uniform provides greater efficiency.

Thus the designer of a light fixture must specify a desired intensity profile for the aperture of the fixture. Such a profile may be expressed as shown below.

$$I(R) = (v-1)(R_{max} - R)/(R_{max} - R_{min}) + 1$$

In this expression I is the intensity of the light projected on the optical window expressed as a function of the radial distance from the center of aperture. V is the permitted variation in intensity, expressed as a ratio of the brightest to darkest region. $R_{max}$ is the distance from the center of the aperture to the outer edge. $R_{min}$ is the radius of a central zone that is excluded from the calculation. If the region of uniformity is to go to the center of the aperture, $R_{min}$ is set equal to zero.

The actual intensity profile obtained from a light fixture may be expressed as $$I(R) = \alpha (\cos(\theta)/L^2) \, T(R) \, \phi(\theta)$$

where T is the transmission function of the lens expressed as a function of R and $\phi(\theta)$ is the light source intensity as a function of incident angle. For an ideal source $\phi(\theta)$ is constant, but for a real source it may be necessary to consider it. In this expression $\alpha$ is a proportionality constant.

Combining these equations yields:

$$\alpha = T_{max}(\cos(\theta_{max}))/(\phi(\theta_{max})I(R_{max}) R_{max}^2)$$

where $T_{max}$ is value of the transmission function at $R_{max}$ and $\theta_{max}$ is the value of $\theta$ at $R_{max}$. Once the transmission function has been defined, a lens is designed to provide that transmission function. That may be done iteratively, using a ray trace model.

FIG. 3 illustrates a portion of a typical lens that may be used as lens 16. Lens 16 is of a transparent material such as polycarbonate or an acrylic material. In the embodiment of FIG. 3, lens 16 has a structured surface, 22, and a smooth surface, 24. Structured surface 22 has structures 26, 28, and 30. It should be noted that the term "smooth" as used to describe surface 24 is a relative term and the surface could have a matte finish in order that a vapor coated metal on surface 24 would provide a diffuse reflector. In other embodiments surface 24 could have structures thereon. Typical structures that might be desired would include pillow lenses such as those used to provide the desired angular distribution of light output in an automative taillight.

Structures 26 on structured surface 22 has facets 34 and 36 making it a triangular prism. A light ray, 38, from light source 20, enters lens 16 through facet 34 and is refracted. Light ray 38 then travels across structure 26 to facet 36 where it undergoes total internal reflection. Thus facet 34 may be called a transmissive facet and facet 36 may be called a reflective facet. Alternatively light ray 40 enters lens 16 through transmissive facet 34 but misses reflective surface 36. In the example of FIG. 3 it is totally internally reflected by surface 24 although in some situations it would be transmitted at a large angle to the primary output direction of the lighting element. In either case it is effectively discarded.

The shape of each of the structures on structured surface 22 is defined by the selection of two angles, identified as angles $\beta$ and $\gamma$ on structure 26 and by the width of the prism. Angle $\beta$ is the angle between transmissive facet 34 and smooth surface 24 while angle $\gamma$ is the angle between reflective facet 36 and a normal to smooth surface 24. Angle $\beta$ and the groove width are chosen to provide the desired transmission function for a particular position on lens 16 and angle $\gamma$ is chosen to insure that the light emerges through optical window 14 in the desired direction.

By way of contrast with the structures shown in FIG. 3, which might be designed to be positioned relatively close to light source 20, structure 42 of FIG. 4 would be intended for use at a greater val of R. As may be seen the sizes $\beta'$ and $\gamma'$ of structure 42 are greater than those of $\beta$ and $\gamma$ of structure 26 of FIG. 3.

EXAMPLE

A lens was designed for a light fixture having a focal length of 0.6 inches, an $R_{min}$ of 0.0 inch, an $R_{max}$ of 5 inches, a fall-off factor (V) of 3 and a constant source angular intensity distribution. Given these assumptions the following lens described in the table below was designed.

| R (inches) | $\beta$ (degrees) | $\gamma$ (degrees) | Groove Width inches |
|---|---|---|---|
| 0 | 30 | 6.088 | .00005 |
| .01 | 30 | 6.088 | .001 |
| .05 | 25.988 | 6.397 | .002 |
| .1 | 21.5 | 6.972 | .005 |
| .2 | 14.5 | 8.49 | .007 |
| .3 | 10.54 | 10.282 | .01 |
| .4 | 10.14 | 12.366 | .01 |
| .5 | 10.301 | 14.196 | .01 |
| .6 | 11 | 15.822 | .01 |
| .7 | 12 | 17.258 | .01 |
| .8 | 12.94 | 18.476 | .01 |
| .9 | 14.18 | 19.601 | .01 |
| 1 | 15.5 | 20.621 | .01 |
| 1.3 | 19.04 | 22.551 | .01 |
| 1.5 | 21.683 | 24.454 | .01 |
| 2 | 26.615 | 26.962 | .01 |
| 2.5 | 29.658 | 28.522 | .01 |
| 3 | 30.72 | 29.323 | .01 |
| 3.5 | 32.5 | 30.166 | .01 |
| 4 | 32.5 | 30.451 | .01 |
| 4.5 | 38.5 | 32.214 | .01 |
| 5 | 40 | 32.774 | .01 |

What is claimed is:

1. A light fixture comprising:
   a housing defining an optical cavity having an optical window for allowing light to escape from said optical cavity;
   a light source in said optical cavity for producing light; and
   a lens lying in said optical window for directing light from said optical cavity through said optical window, said lens having a first surface external to said optical cavity and a second surface internal to said optical cavity, said second surface being a structured surface, said structured surface having a plurality of triangular prisms formed thereon, each said prisms having a transmissive facet and a reflective facet positioned such that light from said light source will enter said lens through one of said transmissive facets, be totally internally reflected by one of said reflective facets and exit through said first surface, where each of said transmissive facets makes a first angle with said optical window and each of said reflective facets makes a second angle with a normal to said optical window, said first and second angles for each of said prisms being selected to provide preselected light intensity distribution over said optical windown, said preselected light intensity distribution being provided by discarding a preselected percentage of said light from said light source.

2. The light fixture of claim 1 wherein said triangular prisms are circular and concentric.

3. The light fixture of claim 2 wherein said preselected light intensity distribution has a region of greatest intensity and a region of least intensity and said region of greatest intensity has an intensity no more than three times as great as that in said region of least intensity.

4. The light fixture of claim 3 wherein said first surface is smooth.

5. The light fixture of claim 4 wherein said optical window lies in a plane.

6. The light fixture of claim 1 wherein said preselected intensity distribution has a region of greatest intensity and a region of least intensity and said region of greatest intensity has an intensity no more than three times as great as that in said region of least intensity.

7. The light fixture of claim 1 wherein said first surface is smooth.

8. The light fixture of claim 7 wherein said preselected light intensity ion has a region of greatest intensity and a region of least intensity and said region of greatest intensity has an intensity no more than three times as great as that in said region of least intensity.

9. The light fixture of claim 7 wherein said optical window lies in a plane.

10. The light fixture of claim 1 wherein said optical window lies in a plane.

11. The light fixture of claim 10 wherein said triangular prisms are circular and concentric.

12. The light fixture of claim 11 wherein said first surface is smooth.

* * * * *

UNITED STATES PATENT AND TRADEMARK OFFICE
CERTIFICATE OF CORRECTION

PATENT NO. : 5,150,966
DATED : Sept. 29, 1992
INVENTOR(S) : Nelson

It is certified that error appears in the above-indentified patent and that said Letters Patent is hereby corrected as shown below:

Col. 3, line 28, Replace "val" with --value--

Col. 4, line 42, Insert --light-- before "intensity"

Col. 4, line 49, Replace "ion" with --distribution--

Signed and Sealed this

Third Day of January, 1995

Attest:

BRUCE LEHMAN

*Attesting Officer*   *Commissioner of Patents and Trademarks*